US009475135B2

(12) United States Patent
Wandebäck et al.

(10) Patent No.: US 9,475,135 B2
(45) Date of Patent: Oct. 25, 2016

(54) MILLING INSERT

(71) Applicant: SANDVIK INTELLECTUAL PROPERTY AB, Sandviken (SE)

(72) Inventors: Gustaf Wandebäck, Gävle (SE); Jörgen Jansson, Gävle (SE)

(73) Assignee: SANDVIK INTELLECTUAL PROPERTY, Sandviken (SE)

(*) Notice: Subject to any disclaimer, the term of this patent is extended or adjusted under 35 U.S.C. 154(b) by 106 days.

(21) Appl. No.: 13/932,396

(22) Filed: Jul. 1, 2013

(65) Prior Publication Data

US 2014/0010607 A1    Jan. 9, 2014

(30) Foreign Application Priority Data

Jul. 5, 2012 (SE) ...................................... 1250773

(51) Int. Cl.
| | |
|---|---|
| B23C 5/20 | (2006.01) |
| B23F 21/12 | (2006.01) |
| B23F 21/14 | (2006.01) |
| B23F 21/16 | (2006.01) |
| B23F 21/22 | (2006.01) |

(52) U.S. Cl.
CPC ............. *B23C 5/207* (2013.01); *B23F 21/128* (2013.01); *B23F 21/146* (2013.01); *B23F 21/166* (2013.01); *B23F 21/226* (2013.01); *B23C 2200/085* (2013.01); *B23C 2200/126* (2013.01); *B23C 2200/165* (2013.01); *B23C 2200/365* (2013.01); *Y10T 407/23* (2015.01)

(58) Field of Classification Search
CPC ................... B23C 2200/12; B23C 2200/212; B23C 2200/125; B23C 2200/165; B23C 2200/365; B23C 5/207; B23C 2200/126; B23C 2200/085

USPC .................. 407/113–115, 42, 48, 35
See application file for complete search history.

(56) References Cited

U.S. PATENT DOCUMENTS

| | | | | |
|---|---|---|---|---|
| 3,881,887 | A | * | 5/1975 | McMaster ........................ 451/49 |
| 4,449,864 | A | * | 5/1984 | Haque et al. .................. 407/113 |
| 4,531,864 | A | * | 7/1985 | Bylund .......................... 407/114 |
| 4,539,875 | A | * | 9/1985 | Lee et al. ........................ 82/1.11 |
| 4,552,492 | A | * | 11/1985 | Komanduri et al. .......... 407/114 |
| 4,812,087 | A | * | 3/1989 | Stashko ........................... 407/42 |
| 5,056,963 | A | * | 10/1991 | Kameno et al. .................. 407/1 |
| 5,071,291 | A | * | 12/1991 | Kaminski ................. B23C 3/06 407/113 |
| 5,147,158 | A | * | 9/1992 | Riviere ......................... 407/113 |
| 5,246,315 | A | * | 9/1993 | Hansson et al. .............. 407/114 |

(Continued)

FOREIGN PATENT DOCUMENTS

| | | | | | |
|---|---|---|---|---|---|
| JP | 05116018 | A | * | 5/1993 | ............... B23C 5/10 |
| JP | 11333605 | A | * | 12/1999 | |

*Primary Examiner* — Sara Addisu
(74) *Attorney, Agent, or Firm* — Corinne R. Gorski

(57) ABSTRACT

A milling insert having an upper side, an under side, a clearance face disposed between the upper and under side, and at least one cutting edge that includes two main edges, which converge toward a nose edge. The cutting edge is formed between two ground part surfaces situated on both sides of a cutting edge line, by on one hand, a primary clearance surface, which is included in the clearance face and is off-plane from a lower, secondary clearance surface, and, on the other hand, a peripheral chip surface, which is included in the upper side and situated on a higher level than a land disposed inside, and which is narrower than the primary clearance surface and has a width of at least 0.3 mm. The milling insert may advantageously be used in milling tools for gear hobbing.

9 Claims, 4 Drawing Sheets

(56) References Cited

U.S. PATENT DOCUMENTS

Figure 8:
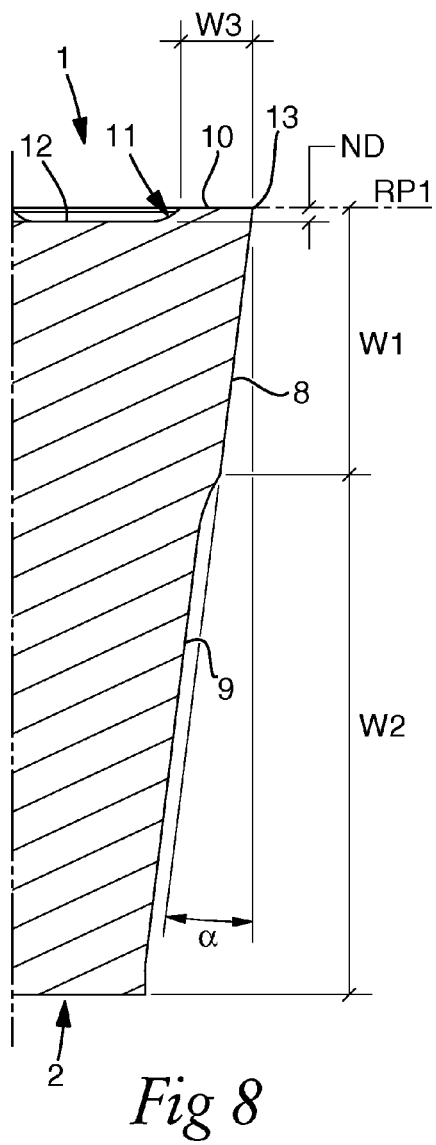

| | | | |
|---|---|---|---|
| 5,593,254 A | 1/1997 | Peters | |
| 5,593,255 A * | 1/1997 | Satran | B23C 5/109 407/113 |
| 5,685,670 A * | 11/1997 | Satran | B23C 5/006 407/113 |
| 5,813,308 A * | 9/1998 | Wildey et al. | 83/835 |
| 5,827,016 A * | 10/1998 | Strand | 407/115 |
| 5,931,613 A * | 8/1999 | Larsson | 407/103 |
| 6,007,766 A * | 12/1999 | Roman | B23B 27/143 407/113 |
| 6,053,671 A * | 4/2000 | Stedt et al. | 407/35 |
| 6,503,030 B2 | 1/2003 | Kress et al. | 408/188 |
| 6,607,335 B2 * | 8/2003 | Morgulis | 407/40 |
| 6,979,153 B1 * | 12/2005 | Shiraiwa | 407/107 |
| 7,059,811 B2 * | 6/2006 | Okamura et al. | 407/113 |
| 7,090,444 B1 * | 8/2006 | Craig | B23C 5/207 407/113 |
| 7,220,083 B2 * | 5/2007 | Festeau | B23C 5/202 407/113 |
| 7,229,236 B2 * | 6/2007 | Craig | B23C 5/109 407/113 |
| 7,275,895 B2 * | 10/2007 | Heinloth | 407/113 |
| 7,281,884 B2 * | 10/2007 | Maeda | B23C 5/109 407/113 |
| 7,390,149 B2 * | 6/2008 | Wihlborg | B23C 5/06 407/102 |
| 7,905,689 B2 * | 3/2011 | Dufour et al. | 407/113 |
| 8,277,151 B2 * | 10/2012 | Wandeback | B23C 5/06 407/113 |
| 8,430,607 B2 * | 4/2013 | Jansson | 407/113 |
| 9,266,175 B2 * | 2/2016 | Jaeger | B23C 5/207 |
| 2003/0063954 A1 * | 4/2003 | Nerlich et al. | 407/35 |
| 2003/0215294 A1 * | 11/2003 | Wermeister et al. | 407/113 |
| 2004/0013478 A1 * | 1/2004 | Dehn | B23C 5/22 407/113 |
| 2004/0131431 A1 * | 7/2004 | Satran | B23C 5/109 407/40 |
| 2005/0135884 A1 * | 6/2005 | Lundvall | 407/113 |
| 2007/0160431 A1 * | 7/2007 | Pantzar | B23C 5/2213 407/67 |
| 2008/0226943 A1 * | 9/2008 | Fang et al. | 428/697 |
| 2008/0273931 A1 * | 11/2008 | Spitzenberger | 407/51 |
| 2010/0183386 A1 * | 7/2010 | Heinloth et al. | 407/113 |
| 2010/0215446 A1 * | 8/2010 | Wandeback | 407/51 |
| 2011/0150582 A1 * | 6/2011 | Sjoo | 407/40 |
| 2014/0234036 A1 * | 8/2014 | Atar | B23C 5/109 407/40 |
| 2015/0037106 A1 * | 2/2015 | Kovac | B23C 5/207 407/33 |
| 2015/0043981 A1 * | 2/2015 | Nagami | B23C 5/06 407/113 |

* cited by examiner

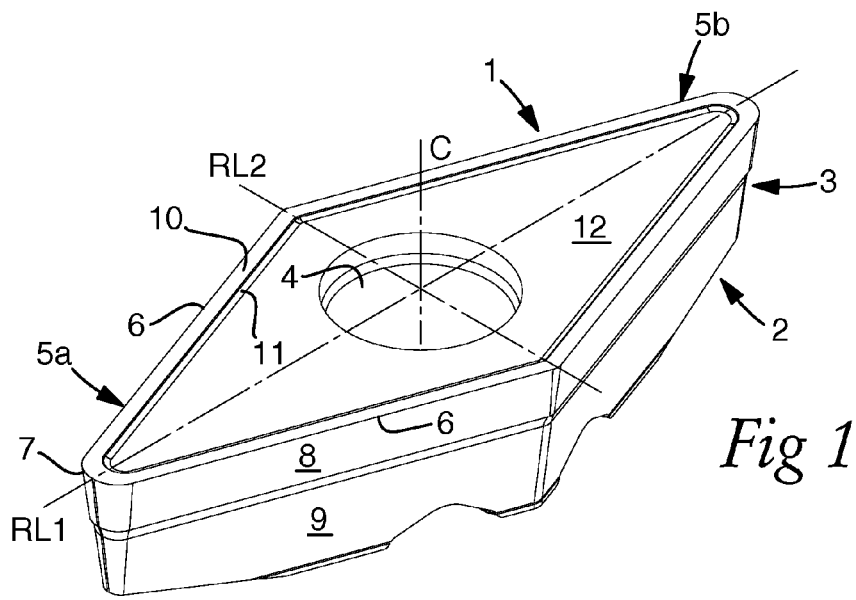
*Fig 1*
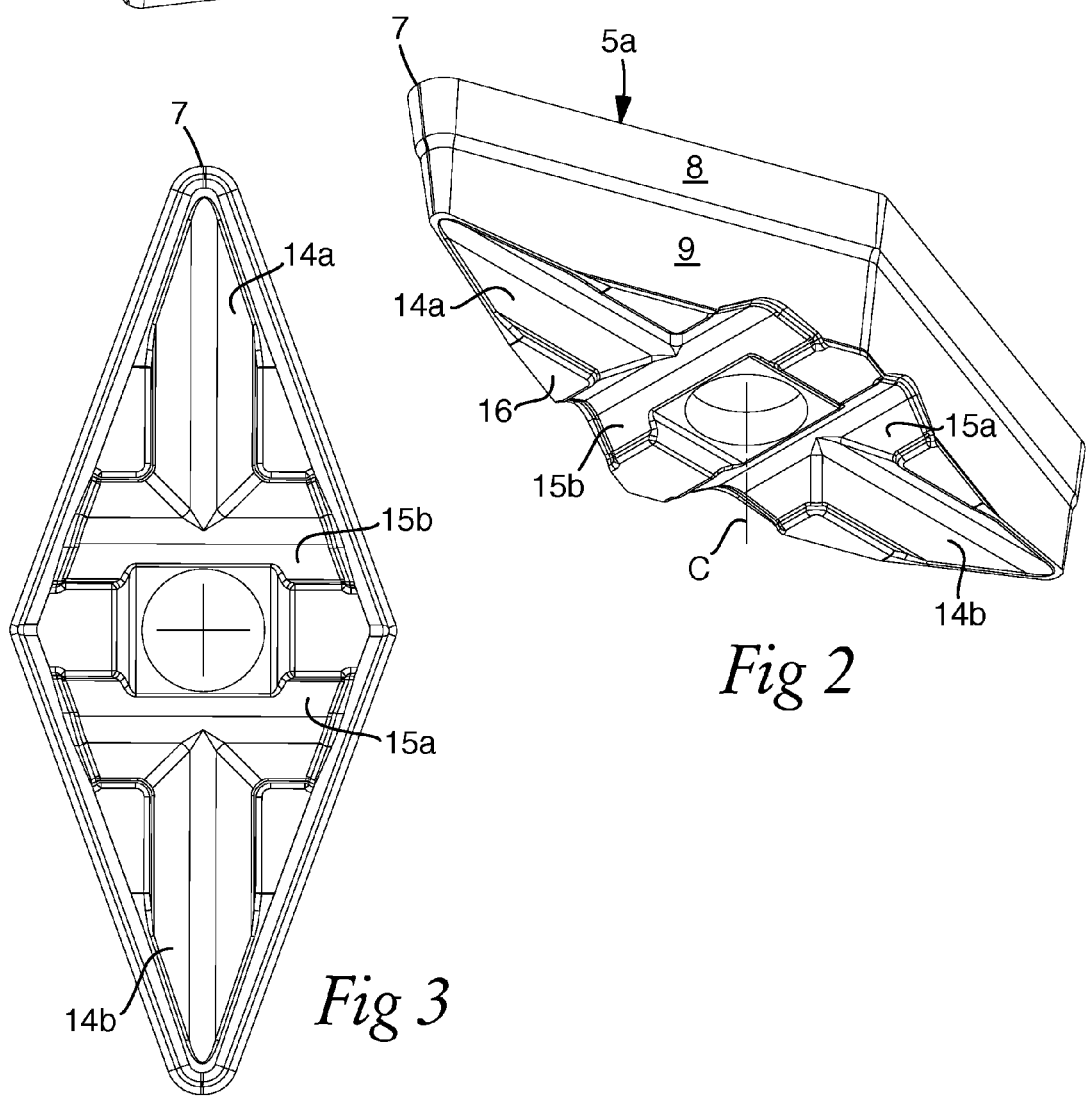
*Fig 2*
*Fig 3*

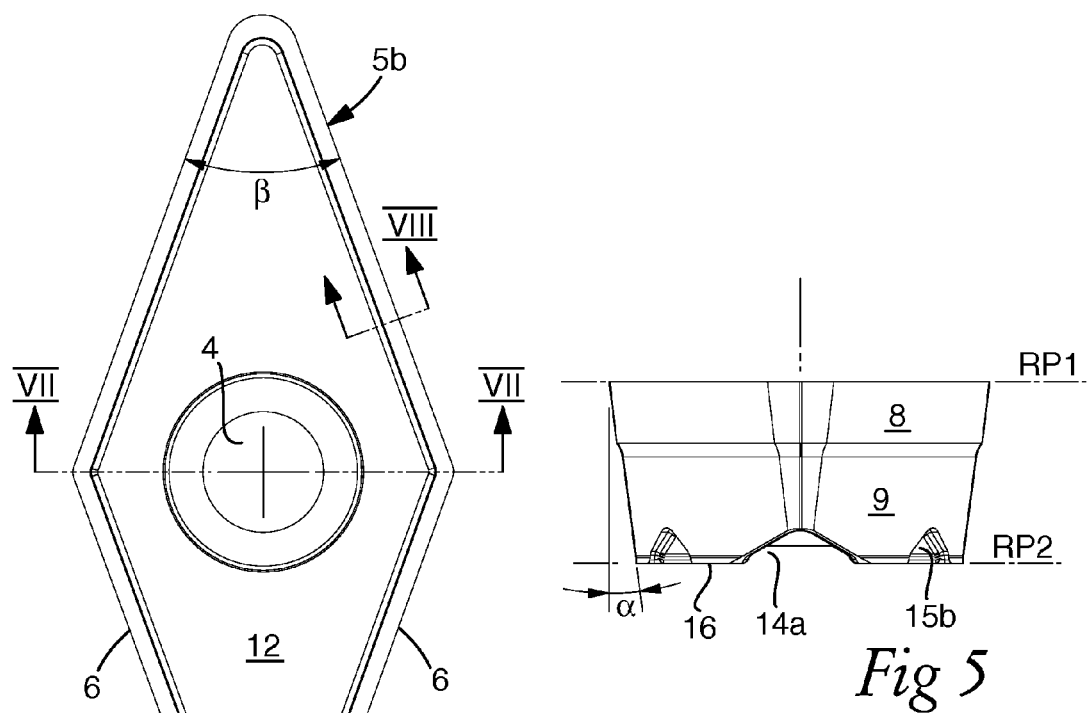
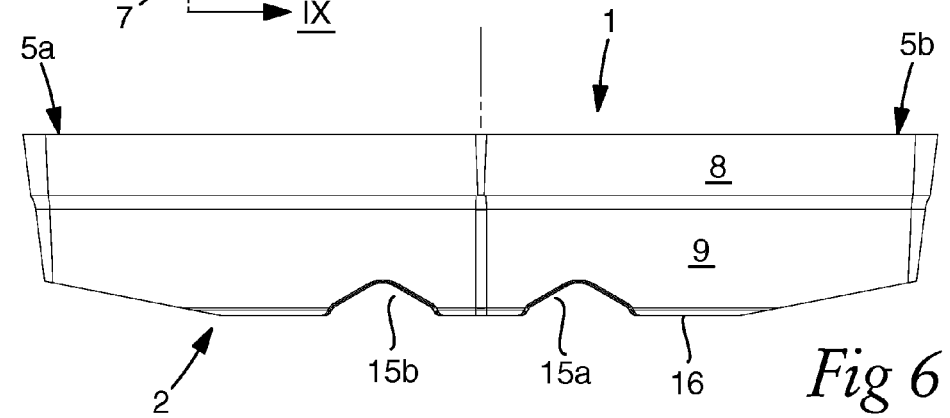
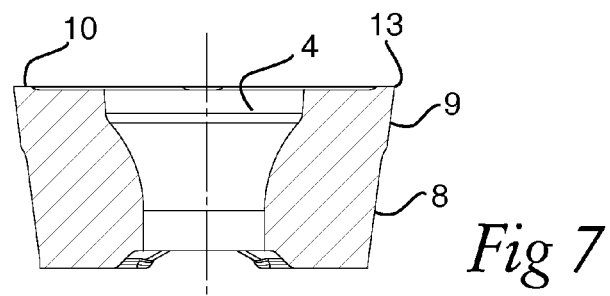

MILLING INSERT

RELATED APPLICATION DATA

This application claims priority under 35 U.S.C. §119 to SE Patent Application No. 1250773.7, filed on Jul. 5, 2012, which the entirety thereof is incorporated herein by reference.

TECHNICAL FIELD OF THE INVENTION

This invention concerns a milling insert of the type that comprises an upper side, an under side, and a clearance face extending between the same, as well as a cutting edge, which is running along a cutting edge line and formed in a transition between the upper side and the clearance face and includes two main edges that converge toward and meet in a nose edge, the milling insert having a positive cutting geometry so far that an angle between the clearance face and a normal to the upper side is acute.

BACKGROUND OF THE INVENTION

The invention has its origin in problems that are associated with milling inserts, more precisely such replaceable milling inserts that are included in tools for so-called hobbing or gear hobbing. Gear hobbing is a relatively new milling method by means of which slots can be milled out of the envelope surface of metallic workpieces having a rotationally symmetrical shape with the ultimate purpose of forming ridges, e.g. in the form of cogs, spline bars or the like, which generally run parallel to the centre axis of the surface of revolution. Briefly, this special milling method means that the workpiece is set in rotation at a moderate rotational speed, at the same time as a high-speed rotating milling tool, which is equipped with milling inserts located in screw formations in relation to the rotation axis of the tool, is given a slow, axial feeding motion during which the individual milling insert first enters the workpiece while removing a relatively small chip, and then leaves ("rolls off") the workpiece. In a later moment, when the workpiece has rotated one revolution, a milling insert, which has been fed forward axially a short distance, will once again enter the initiated slot and remove more material from the workpiece. This is repeated until the recessed slot has obtained the desired length. In comparison with traditional gear milling, gear hobbing affords the advantage that the machining can be carried out faster and more cost-effective.

Modern milling inserts for gear hobbing are so-called full profile inserts, i.e., milling inserts that in the moment of engagement remove a chip along two converging main edges as well as along an end or nose edge in one and the same pass.

Within all forms of cutting or chip removing machining of metal blanks, the design of the cutting edges of the cutting inserts has a large bearing on the performance of the tool, above all in respect of the dimensional accuracy and surface finish of the manufactured components. In this respect, hob cutters are no exception. On the contrary, the dimensional accuracy of the flank surfaces that delimit the slots between adjacent ridges of the workpiece, e.g. the gashes between two adjacent cogs, has a large bearing on the function of the component. In many cases, no finishing is required if the generated flank surfaces already during the milling obtains a good dimensional accuracy and surface finish. Even if finishing would be called for in individual cases, the waste of time and the cost therefor is, however, decreased, if the critical surfaces of the milled component already initially have a good dimensional accuracy.

In this connection, it should be pointed out that the basic body of the milling tool usually is manufactured from steel, while the replaceable milling inserts are manufactured from a material that is harder and more wear-resistant than steel, e.g. cemented carbide or the like. This usually takes place in facilities that are separated from each other. When the milling inserts are manufactured from cemented carbide, the outcome in the manufacture may vary from milling insert to milling insert. Among other things, the micro geometry of the cutting edges may vary. For this reason, directly pressed milling inserts, i.e., milling inserts that are not ground, obtain their final shape already in connection with pressing and sintering, a mediocre dimensional accuracy in the context, above all in respect of the exact spatial location of the cutting edge line. The requirements of dimensional accuracy of the cutting edges are at times extreme and may be about 0.01 mm or less.

Like other replaceable milling inserts, milling inserts have a limited service life (often within the range of 5-10 min), and therefore the same are mass-produced in large series. As a consequence of the limited service life, frequent insert replacements are required to maintain a good manufacturing precision. This means that the cost of the milling inserts has a vital importance to the user and his/her possibilities to keep down the manufacturing cost. Of the total cost of a high-performance milling insert, the cost of grinding is a considerable part.

PRIOR ART

A milling insert of the type initially mentioned and intended for gear hobbing is previously known by U.S. Pat. No. 5,593,254. In this case, the upper side of the milling insert has in its entirety the shape of a plane surface, which serves as a chip surface. Furthermore, the clearance face extends all the way from the upper side to a likewise plane under side, which is intended to abut against a plane support surface of a tooth included in the tool. If said milling insert would need to be ground to provide a good dimensional accuracy of the cutting edge, the total grinding area, i.e., the entire upper side and the entire clearance face adjacent to the cutting edge, becomes so large that the share of the grinding cost of the total manufacturing cost of the milling insert becomes disproportionately large.

Another disadvantage of known milling inserts of the kind in question is of grinding technical nature, depending on there being a difference between face grinding and peripheral grinding. Face grinding of the upper side and possibly also the under side of a milling insert is traditionally carried out by a rotary grinding wheel or cylinder grinding wheel being kept pressed against the grinding surface in so question. If both the upper side and the under side are to be ground, two contra-rotating grinding wheels are kept pressed against the two grinding surfaces, the milling insert being kept loosely in place by a mask, e.g. in the way disclosed in U.S. Pat. No. 6,007,766. Grinding of the peripheral clearance surface is, however, carried out in an entirely different step, viz. in a peripheral grinding machine, in which the milling insert is clamped in a well-defined position at the same time as a rotary abrasive, e.g. a pin, sweeps forward along the periphery of the milling insert. The fact that grinding of the chip and clearance surfaces of the individual cutting edge is carried out in two different steps means that the precision of the grinding becomes difficult to check and control, in particular in the light of the milling insert during the face grinding step not being kept fixed in a geometrically well-defined position.

Objects and Features of the Invention

The present invention aims at obviating the above-mentioned disadvantages of previously known milling inserts and at providing an improved milling insert. A primary object of the invention is to provide a milling insert, which can be manufactured by extraordinary precision in respect of the micro geometry and spatial location of the cutting edge line, without the requisite grinding unnecessarily burdening the total cost of the manufacture of the milling insert. A further object is to provide a milling insert that is especially suitable for gear hobbing and allows frequent insert replacements so as to maintain a good surface quality and good dimensional accuracy of the machined components.

According to the invention, the primary object is attained by the cutting edge of the milling insert being formed between two ground part surfaces situated on both sides of the cutting edge line, viz., on one hand, a primary clearance surface, which is included in the clearance face and is off-plane from a secondary clearance surface, and, on the other hand, a peripheral chip surface, which is included in the upper side and situated on a higher level than a land being inside, and which is narrower than the primary clearance surface as well as has a width of at least 0.3 mm.

By forming the cutting edge between, on one hand, a chip surface having a limited width and thereby a limited grinding area, and, on the other hand, a primary clearance surface the width of which is smaller than the extension of the clearance surface between the upper side and the under side, the surfaces needing to be ground to provide extraordinary high dimensional accuracy in respect of the spatial location of the generated cutting edge line are minimized. In doing so, peripheral grinding of the chip surface as well as the primary clearance surface in one and the same set-up is made possible.

In one embodiment, the width of the primary clearance surface is smaller than the width of the secondary clearance surface. In such a way, the area of the first-mentioned part surface requiring grinding is reduced to a minimum.

In one embodiment, the width of the chip surface amounts to at most 50% of the width of the primary clearance surface. In such a way, the grinding area of the chip surface is minimized at the same time as the primary clearance surface becomes sufficiently wide to make the cutting edge strong and resistant to the dominant cutting forces.

In one embodiment, it is stipulated that the projection area of the chip surface should amount to at most 20% of the total projection area of the upper side. Therefore, although the cutting edge can be made by extraordinary dimensional accuracy, only a smaller part of the upper side of the milling insert needs to be ground.

In a feasible embodiment, the chip surface of the cutting edge is made plane. In such a way, the grinding becomes simple and can be carried out by means of a plane side surface of a grinding wheel.

In particular when the chip surface has the shape of a plane surface, the same may in its entirety be situated in a reference plane that defines the upper side of the milling insert.

In one embodiment, the under side of the milling insert may include a long narrow groove, which is running in the same direction as a bisector between the two main edges of the cutting edge. This groove may on one hand hold the milling insert fixed laterally when the under side is pressed against a support surface of the basic body of the tool, and on the other hand be utilized to clamp the milling insert in an accurately defined location in connection with the grinding of the chip surface and the primary clearance surface.

In one embodiment, the under side of the milling insert may also include a second groove, which is running perpendicular to the first-mentioned one. This second groove blocks the milling insert from moving in the direction parallel to the first groove, i.e., in the longitudinal direction of the milling insert, at the same time as the first groove prevents movement of the milling insert laterally.

BRIEF DESCRIPTION OF THE APPENDED DRAWINGS

Figure 9:
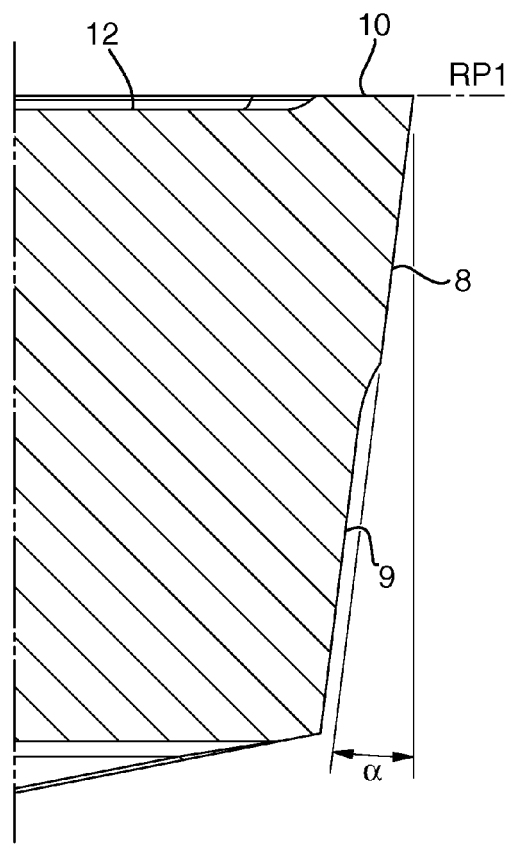
Figure 10:
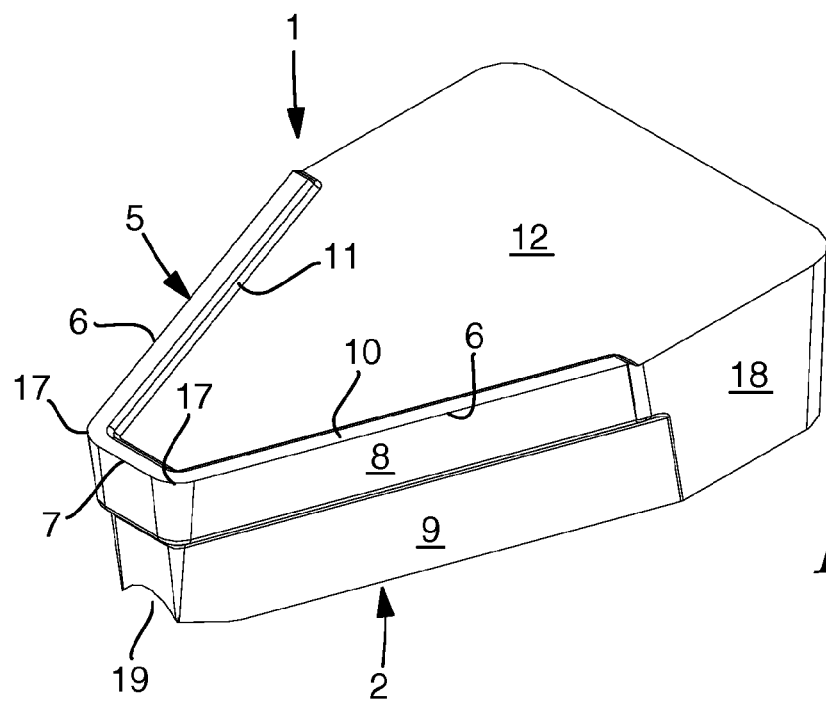
Figure 11:
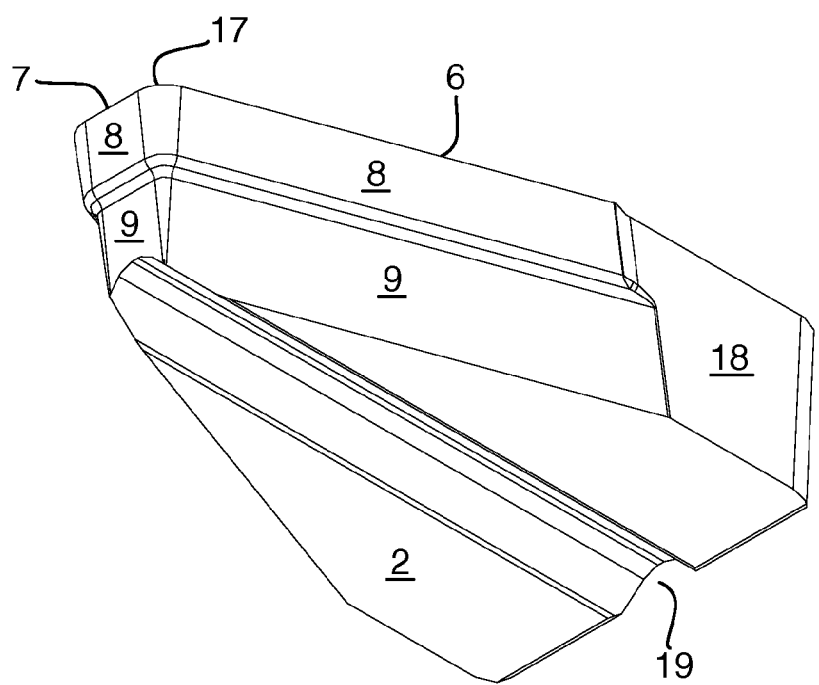

In the drawings:

FIG. 1 is a perspective view of a first embodiment of the milling insert according to the invention, FIG. 2 is a bottom perspective view of the same cutting insert, FIG. 3 is a planar view from below of the milling insert, FIG. 4 is a plan view from above of the same milling insert, FIG. 5 is an end view of the milling insert, FIG. 6 is a side view of the same, FIG. 7 is a cross section VII-VII in FIG. 4, FIG. 8 is an enlarged detailed section of the section VIII in FIG. 4, FIG. 9 is an analogous detailed section of the section IX-IX in FIG. 4, FIG. 10 is a perspective view of an alternative embodiment of the milling insert, and FIG. 11 is a bottom perspective view of the milling insert according to FIG. 10.

DETAILED DESCRIPTION OF PREFERRED EMBODIMENTS OF THE INVENTION

In FIGS. 1-9, a milling insert made in accordance with the invention is shown, which includes an upper side (also denominated "chip face") in its entirety designated 1, an under side in its entirety designated 2, and a clearance face that extends between the same and in its entirety is designated 3. Between the upper and under sides 1, 2, a centre axis C of the milling insert extends. This is located in the point of intersection between two straight reference lines RL1, which is a longitudinal axis, and RL2, which is a transverse axis, which reference lines RL1, RL2 form right angles with each other. The axis C also forms a centre axis of a through hole 4 intended to receive a screw for the fixation of the milling insert in a basic body of the tool (not shown).

In the example, the milling insert is indexable by including two alternately usable cutting edges 5, which are identical in respect of their shape as well as their spatial location in relation to the centre axis C. Although the cutting edges are identical, the reference designation 5 has been supplemented with the suffixes a and b, respectively, so that the cutting edges should be distinguishable in the following description.

Each cutting edge is in its entirety V-shaped and includes two main edges 6, which in the example are straight and converge toward an end or nose edge 7, in which they meet while forming a single, continuous cutting edge 5. In the example shown, the nose edge 7 is round, more precisely so far that the cutting edge line thereof is a circular arc line, which directly transforms into the straight cutting edge lines of the main edges 6, the last-mentioned ones forming tangents to the circular arc line. Generally, the cutting edge 5 is formed in the transition between the upper side 1 and the clearance face 3.

In the embodiment shown, the milling insert has a positive cutting geometry so far that the surface of the clearance face situated closest to the upper side forms an acute angle α with a normal to the reference plane RP1 of the upper side. In the example, said clearance angle α amounts to 7°. This value may, however, vary upward as well as downward, e.g. within the range of 5-12°.

The cutting edge 5 is formed between two ground part surfaces of limited width. One of said part surfaces is a primary clearance surface 8, which is situated closest to the upper side of the milling insert and is off-plane from a secondary clearance surface 9, which extends between the primary clearance surface and the under side 2 of the milling insert. The second part surface is a chip surface 10 that is included in a peripheral border 11, inside which there extends a land 12 that is situated on a lower level than the chip surface 10. As is seen in FIG. 8, the primary clearance surface 8 has a width W1 that is considerably smaller than the width W2 of the secondary clearance surface 9. In the example, these width measures are measured as the projection surfaces of the part surfaces 8, 9 as viewed from the side of the milling insert. In the example, the width W2 of the secondary clearance surface 9 is approximately twice as large as W1. In the embodiment shown, the two part surfaces 8, 9 are located in planes that are parallel to each other, implying that the secondary clearance surface 9 has the same clearance angle α as the primary clearance surface 8. In this case, the plane separation is provided by the primary clearance surface 8 being included in a border-like, projecting material portion closest to the upper side of the milling insert.

Before the milling insert is further described, the difference between a chip surface and a reinforcement bevel (=reinforcing chamfer surface) will be elucidated in more detail. A chip surface is the part surface of the milling insert against which the removed chip is formed. Depending on the field of application, the width of the chip surface may vary, but amounts at all events to at least 0.3 mm. Most often, a conventional chip surface is wider. A reinforcement bevel is, on the contrary, an utmost narrow surface formed between the proper chip surface and the clearance surface for reinforcing the cutting edge along the cutting edge line 13 present between the chip surface and the clearance surface. Also, the width of a reinforcement bevel may vary, depending on the field of application. Most often, however, the width of a reinforcement bevel is limited to the range of 0.05-0.15 mm and in exceptional cases somewhat greater, however without being more than 0.25 mm.

The chip surface 10 included in the milling insert according to the invention is narrower than the primary clearance surface 8, but has a width of at least 0.3 mm. By this relationship, it is guaranteed, on one hand, thanks to the ample width of the primary clearance surface 8 in comparison with the one of the chip surface, that the cutting edge becomes resistant to the dominant cutting forces that attack the milling insert in the direction of the chip surface 10, and, on the other hand, a minimization of the grinding area of the surface needing to be ground on the chip face, viz. the chip surface 10. By the chip surface 10 having a smallest width of 0.3 mm, it is, however, guaranteed that the chip can be formed against the chip surface 10 in a reliable way in connection with the moderate cutting depths that are at hand in connection with gear hobbing. However, depending on the application, the width measure W3 may be increased from 0.3 mm, provided that W3 does not exceed W1. Namely, if W3 is increased with the purpose of allowing a greater feed per tooth and thereby a greater chip thickness, also the cutting forces will increase, and therefore also W1 needs to be increased to give a sufficiently strong cutting edge.

In the example, the width W3 of the chip surface 10 amounts to approx. 25% of the width W1 of the primary clearance surface 8. This relationship may per se vary, but should be within the interval of 20-60%.

The level difference ND (see FIG. 8) between the reference plane RP1 (=the level of the chip surface 10) and the land 12 may in practice be small, e.g. within the range of 0.02-0.10 mm. The essential is that the level difference guarantees that a grinding wheel, which provides for the grinding of the chip surface 10, clears the land 12.

In the embodiment shown in FIGS. 1-9, the milling insert has a rhombic basic shape, the two main edges 6 of the individual cutting edge 5 extending all the way from the nose edge 7 to the reference line RL2, where they transform into the corresponding main edges of the diametrically opposed cutting edge. The two main edges 6 are symmetrically situated in relation to the reference line RL1, implying that RL1 in this embodiment forms a bisector of the angle of convergence β of the cutting edges. In the example, β amounts to 40° (β/2=20°).

In this case, the under side 2 of the milling insert (see FIGS. 2 and 3) is formed with a connecting surface, in which two pairs of grooves or female-like chutes are included, viz. on one hand two longitudinal grooves 14a, 14b, which are running from the nose edges 7 toward the centre axis of the milling insert, and on the other hand two transverse grooves 15a, 15b, which extend perpendicular to the grooves 14a, 14b. When the cutting edge 5a is indexed forward into an operative state in the appurtenant basic body of the tool, the grooves 14a and 15a co-operate with two ridges that are formed in the seat of the basic body of the tool and, in analogy with the grooves 14a, 15a, are located perpendicular to each other. In this case, the plane surfaces 16, which surround the grooves and which are situated in the lower reference plane RP2, will not rest against any corresponding support surfaces in the seat. On the contrary, the milling insert will abut by two V-shaped arranged flank surfaces in the grooves 14a, 15a against analogous flank surfaces along the ridges.

As pointed out above, the width of the individual chip surface 10 may vary in an interval from 0.3 mm to a maximum value. This maximum value should be selected so that the peripheral chip surface, which in this case continuous, obtains a projection area that is less than 20% of the total projection area of the upper side.

It should also be noted that the chip surface 10 in this case is plane and in its entirety situated in the reference plane RP1 that defines the upper side of the milling insert. For the sake of completeness, it should also be mentioned that the land 12 positioned inside the chip surface is unground, i.e., has the surface structure that cemented carbide obtains after pressing and sintering. It should be axiomatic that also the secondary clearance surface 9 is unground.

Reference is now made to FIGS. 10 and 11 that illustrate an alternative milling insert in which only one cutting edge 5 is included, which, like the cutting edges described above, has a V-like contour shape. Thus, the cutting edge includes two main edges 6, which converge toward a nose or end cutting edge 7. In this case, however, the nose edge 7 is not arched but straight, the same transforming into the straight main edges 6 via so-called radius transitions 17. In addition, the nose edge 7 has an ample length that generates comparatively wide gash bottoms between adjacent cogs. As a consequence of this shape of the nose edge 7, the milling insert is particularly suitable for the gear hobbing of gashes between involute teeth.

In the same way as previously, the cutting edge 5 is formed between a primary clearance surface 8 and a chip surface 10 included in a peripheral border 11. Only the part of the clearance face that connects to the cutting edge includes a secondary clearance surface 9, which is off-plane from the primary one. However, the clearance face along the rear portion of the milling insert is shown with trivial surfaces 18.

In this case, the milling insert is intended to be fixed by another tightening device than a screw, preferably a clamp or another tightening device, which does not require any hole in the milling insert. Furthermore, the under side 2 of the milling insert consists of a plane surface, in which a long narrow groove 19 is countersunk. Said groove 19 is running in the same direction as a bisector between the two main edges 6 of the cutting edge 5, and extends between the front and rear ends of the milling insert. The purpose of the groove is to hold the milling insert fixed, when the plane under side is pressed against a likewise plane support surface, which has been formed with a guiding, long narrow ridge (not shown). The groove may also be utilized to clamp the milling insert in an accurately defined location in connection with the grinding of the chip surface 10 and the primary clearance surface 8.

The manufacture of the milling insert according to the invention is carried out in several steps, a first one of which consists of pressing and sintering a cemented carbide forming powder mass while forming a cutting body having the general geometrical shape that is shown in the drawings. In a second step, grinding of the individual cutting edge follows. This is effected by so-called peripheral grinding, in which an abrasive, e.g. a grinding wheel, is brought peripherally along the cutting edge at the same time as the milling insert is held fixed in a holder. Because the grinding of not only the primary clearance surface but also the chip surface can be effected by peripheral grinding (contrary to face grinding of an entirely plane upper side), the two grinding operations can be accomplished in one and the same set-up, i.e., without the milling insert being moved between different stations. This means that the control of the grinding operations will be exceptionally good. More precisely, the grinding may be carried out so that the spatial location of the cutting edge line in relation to centre axis can be predetermined by tolerances in the order of 0.001 mm. This ensures that the surfaces generated by the milling insert in the workpiece, e.g. the flank surfaces of cogs, obtain an exceptionally good dimensional accuracy already in connection with the milling.

In a possibly third step, the milling insert may be surface coated using a microscopically thin protective layer with the purpose of strengthening the individual cutting edge and increasing the operative service life thereof.

An advantage of the invention besides allowing peripheral grinding in one and the same set-up—with the ensuing dimensional accuracy—is that the grinding can be carried out fast and easy and with a minimum of wear of the abrasives, which need to sweep over surfaces having a minimal area for providing the desired cutting edge.

A usually occurring milling method, besides gear hobbing, is slit cutting. In this case, a rotatable, circular disc is used, the periphery of which is equipped with a plurality of tangentially spaced-apart milling inserts. In certain applications, slit cutting gives a particularly efficient machining, e.g. when long and deep slots are to be formed in a workpiece. Because the milling insert according to the invention on one hand is cutting trilaterally, i.e., includes cutting edges having three simultaneously active part edges, viz. the nose edge and the two main edges, and on the other hand can be manufactured at high dimensional accuracy, the same is excellently well suitable also for use in slitting cutters.

Feasible Modifications of the Invention

The invention is not limited only to the embodiments described above and shown in the drawings. Thus, the invention may also be applied to other milling inserts than exactly such ones that are intended for gear hobbing and slit cutting, respectively. Concerning the ground chip surface of the individual cutting edge, it should be pointed out that the same does not necessarily have to be plane, but may be slightly arched in cross-section, e.g. concavely arched. Neither does the chip surface need to be located with the outer and inner, respectively, boundary lines thereof situated in one and the same plane. Thus, the chip surface may be tilted in relation to the upper reference plane of the milling insert, more precisely by the cutting edge angle (the angle between the chip surface and the primary clearance surface) increasing in comparison with the exemplified cutting edge angle. In other words, the chip surface may be located so that its inner boundary line is on a higher level than the outer cutting edge line. In the exemplified embodiments, the chip surface as well as the primary clearance surface is of a uniform width along its entire extension. Neither is this feature any necessary condition for the realisation of the invention. Thus, it is possible to reduce the width of the primary clearance surface in the backward direction from the nose edge. Furthermore, the chip surface of one of the main edges may be wider than the chip surface along the other main edge. Neither needs the individual main edge to have a straight shape, but instead have a slightly cambered shape. Furthermore, the two main edges need not be symmetrically placed in relation to the reference line RL1. Thus, the angle between one of the main edges in relation to said reference line may differ from the angle between the reference line and the other main edge, for instance with the purpose of providing cog flanks having different flank angles. It should also be mentioned that the indexable milling insert according to FIGS. 1-9 does not need to have a rhombic basic shape. Thus, shorter main edges, which together with a nose edge form a V-shaped cutting edge, may be connected to an intermediate section of the milling insert, the side surfaces of which run parallel to each other. Furthermore, the plane difference between the primary clearance surface and the secondary one may be provided in another way than by locating the primary clearance surface on a border-like bulge. Thus, the milling insert may be formed so that the primary clearance surface, via a lower boundary line, transforms into a secondary clearance surface, the clearance angle of which is greater than the clearance angle of the primary clearance surface. In an analogous way, the chip surface may, via an inner boundary line, transform into a land that is tilted in relation to the chip surface. Thus, the essential is that an abrasive can be swept over the grinding surface in question, without contacting the adjacent, unground surface (the secondary clearance surface and the land, respectively). The fact that the chip surface may be peripherally ground instead of being face ground, entails in addition a freedom for the designer to form, adjacent to the central hole of the milling insert, a ring-shaped reinforcement that can be allowed to project above the plane in which the chip surface is situated. A further alternative to separate the planes of the primary and secondary clearance surfaces from each other is to, on one hand, form the primary clearance surface on a bulge of the type that has been exemplified in the drawings, and, on the other hand, give the secondary, lower clearance surface a clearance angle that is smaller than the one of the primary one. In case the nose edge of the milling insert is round, as exemplified in FIGS. 1-9, its shape may be modified so far that a narrow and centrally located chamfer surface is formed in (e.g. ground in into) the convexly arched, front portion of the primary clearance surface. In such a way, a central, extremely short part edge is obtained (e.g. within the range of 0.05-0.50 mm), which may be straight if the chamfer surface is made plane, or arched (concave or convex) if the chamfer surface is made arched. Such a, diminutive front part cutting edge is in certain applications desired in connection with the milling of cogs.

The invention claimed is:

1. A milling insert, comprising:
   an upper side;
   an under side;
   a clearance face extending between the upper and under side; and
   a cutting edge, which runs along a cutting edge line and is formed in a transition between the upper side and the clearance face, the cutting edge including two main edges that converge toward and meet in a nose edge, the milling insert having a positive cutting geometry formed by a clearance angle between the clearance face and a normal to the upper side, the clearance angle being acute, and wherein the cutting edge is formed between two ground part surfaces situated on both sides of the cutting edge line one of the ground part surfaces being a primary clearance surface included in the clearance face, the primary clearance surface being off-plane and projecting from a secondary clearance surface, and the other ground part surface being a peripheral chip surface included in the upper side and situated on a higher level than a land located inside the peripheral chip surface, the peripheral chip surface being narrower than the primary clearance surface and having a width of at least 0.3 mm.

2. The milling insert according to claim 1, wherein the width of the primary clearance surface is smaller than the width of the secondary clearance surface.

3. The milling insert according to claim 1, wherein the width of the chip surface amounts to at most 50% of the width of the primary clearance surface.

4. The milling insert according to claim 1, wherein the chip surface has a projection area of at most 20% of an entire projection area of the upper side.

5. The milling insert according to claim 1, wherein the chip surface is planar.

6. The milling insert according to claim 5, wherein the chip surface is in its entirety situated in a reference plane that defines the upper side of the milling insert.

7. The milling insert according to claim 1, wherein the underside of the milling insert includes a first, long narrow groove running in the same direction as a longitudinal axis between the two main edges of the cutting edge.

8. The milling insert according to claim 7, wherein the longitudinal axis is a bisector between the two main edges of the cutting edge.

9. The milling insert according to claim 7, wherein the underside of the milling insert includes a second groove perpendicular to the first groove.

* * * * *